United States Patent [19]

Nyman et al.

[11] Patent Number: 4,678,291
[45] Date of Patent: Jul. 7, 1987

[54] OPTICAL ARRANGEMENT FOR MICROSCOPES

[75] Inventors: Georg N. Nyman; Ferdinand Pauliny; Klaus P. Schindl, all of Vienna, Austria

[73] Assignee: C. Reichert Optische Werke AG, Vienna, Austria

[21] Appl. No.: 681,780

[22] Filed: Dec. 14, 1984

[51] Int. Cl.[4] .......................... G02B 7/02; G02B 7/18; G02B 21/18

[52] U.S. Cl. .................................... 350/510; 350/511; 350/520

[58] Field of Search ................................ 350/510–511, 350/526, 524, 520, 572, 518–519

[56] References Cited

U.S. PATENT DOCUMENTS

| 3,785,714 | 1/1974 | Hock et al. | 350/524 |
| 3,924,926 | 12/1975 | Merstallinger et al. | 350/511 |
| 4,512,640 | 4/1985 | Nihoshi | 350/572 |

FOREIGN PATENT DOCUMENTS

| 7144093 | 4/1972 | Fed. Rep. of Germany. | |
| 2428807 | 1/1975 | Fed. Rep. of Germany | 350/510 |
| 2468925 | 5/1981 | France | 350/511 |
| 751149 | 6/1956 | United Kingdom | 350/520 |

*Primary Examiner*—William H. Punter
*Attorney, Agent, or Firm*—Alan H. Spencer

[57] ABSTRACT

To allow rapid change between the conoscopic observation method and the orthoscopic observation method in a microscope, while showing a small overall size and permitting and optically correct position of the Bertrand lens and the associated diaphragm, an additional supplementary beam path can be selectively used in addition to the main beam path. The supplementary beam path includes the Bertrand lens and the iris diaphragm and extends away from the optical axis of the microscope objective in a lateral direction.

13 Claims, 3 Drawing Figures

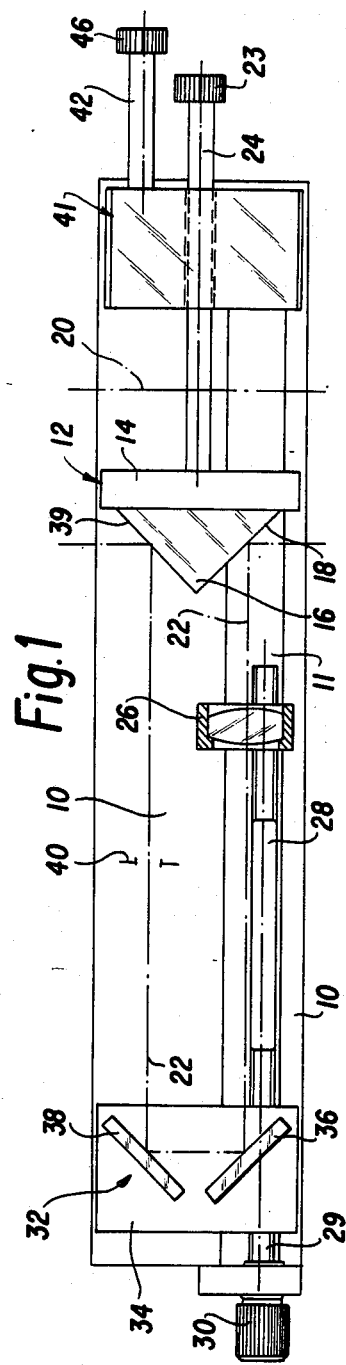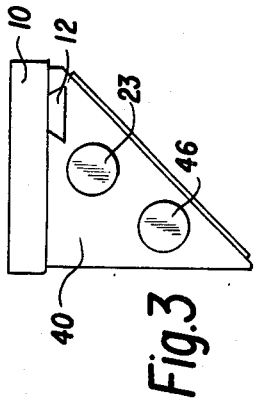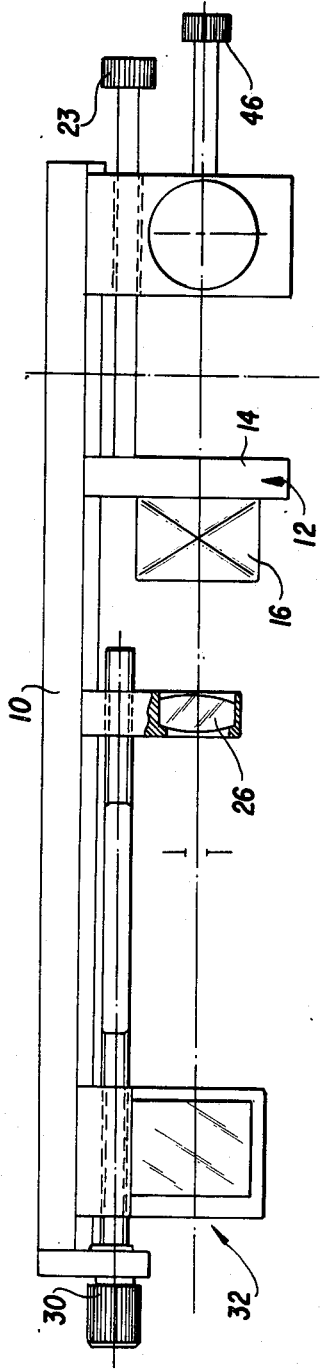

OPTICAL ARRANGEMENT FOR MICROSCOPES

BACKGROUND OF THE INVENTION

The invention relates to an optical arrangement for a microscope, with a main beam path in which a microscope objective and an observation tube are located, and with an additional supplementary beam path which can be selectively interposed between the microscope objective and the observation tube in place of a portion of the main beam path, and an optical deflection element which can be inserted into the main beam path and withdrawn from the main beam path to select between the main beam path and the supplementary beam path, wherein the supplementary beam path includes at least first, second and third optical surfaces each deflecting the beam, the third optical surface deflecting the supplementary beam path into the observation tube.

An example of an optical arrangement of this type is given in Austrian Patent Specification 333,052. In that Specification, the supplementary beam path is provided when the optical deflection element is removed from the optical main beam path, whilst when the optical deflection element is inserted into the optical main beam path, the beam coming from the microscope objective is deflected directly into the observation tube. Consequently, the supplementary beam path is aligned with the optical axis of the microscope objective as far as the first optical surface deflecting the beam, and until then runs generally vertically. The three optical surfaces deflecting the beam then deflect the supplementary beam path in such a way that it ultimately coincides with the main beam path entering the observation tube. According to Austrian Patent Specification No. 333,052 or the corresponding U.S. Pat. No. 3,924,926, at least one image of the object field or at least one image of the object field and an image of the exit pupil of the objective will be located within the additional beam path before the beam is first deflected, and furthermore at least one element controlling polarisation will be provided near one of these images. The advantage of this arrangement is that all optical elements interfering with polarisation are avoided.

Polarisation microscopy makes a basic distinction between two different observation methods, orthoscopic and conoscopic observation. In orthoscopic observation, among other things the shape, size distribution, colour structure and grain boundaries of a thin section of rock or stratum are examined in polarised light, whereas in the conoscopic observation of a crystal grain discovered orthoscopically the interference phenomenon arising in the objective exit pupil is observed. This so-called axis interference makes it possible to determine the number and angles of the axes and other optical properties of a crystal. To display this axis interference, a thin section of a particle of interest is first examined in polarised light. A focusable auxiliary lens, the Bertrand lens, is then placed in the beam path, focussed on the exit pupil of the high-aperture objective used and centered, if necessary, the particle is isolated by means of a pinhole diaphragm and the interference pattern obtained is observed.

The known Reichert microscope sold under the trademark Zetopan Pol has in the monocular observation tube a focusable Bertrand lens which is located at the optically correct point and which can be moved into and out of the beam path. It is therefore possible in this instance to change quickly from orthoscopic observation to conoscopic observation. However, the length and circumference of the monocular observation tube are considerable. But above all, only monocular and not binocular observation is possible.

In the known Leitz microscope sold under the trademark Orthoplan Pol, which does have a binocular observation tube, a Bertrand lens and a diaphragm can be moved into and out of the main beam path of the microscope before deflection into the inclined binocular observation tube. However, a compromise is obviously reached here as regards the optical positions of the Bertrand lens and of the diaphragm, and the overall height of the microscope is also considerable.

OBJECTS OF THE INVENTION

The invention has as one object to provide an optical arrangement which is suitable for several different observation methods, particularly for the orthoscopic and conoscopic observation methods.

A further object is to provide an arrangement in which, notwithstanding a small overall height, the optical elements for conoscopic observation are located at the optically correct points. A still further object is to provide such an arrangement which is suitable for use in a monocular observation tube or a binocular observation tube alike.

SUMMARY OF THE INVENTION

These objects are achieved, according to the invention, because, when the optical deflection element is inserted into the optical main beam path of an arrangement of the foregoing kind, the beam from the microscope objective is deflected laterally away into the supplementary beam path, and because a Bertrand lens and a field-limiting element, preferably an iris diaphragm, associated with the Bertrand lens are provided between the optical deflection element and the third optical surface.

In the arrangement according to the invention, the Bertrand lens and field-limiting element are not moved into and out of the main beam path of the microscope, but in contrast are arranged fixedly in a supplementary beam path which can be chosen simply by displacing an optical deflection element instead of the corresponding portion of the main beam path. However, since the supplementary beam path does not have its main extension in a vertical direction, but in a horizontal or lateral direction, the overall height can be kept small even with the Bertrand lens and associated diaphragm located in their correct optical positions.

Advantageously, the Bertrand lens is located between the optical deflection element and the first optical surface, and the field-limiting element associated with the Bertrand lens is located between the second optical surface and the third optical surface. In this way, the lateral extension of the additional beam path can also be kept relatively short.

Preferably, the first and second optical surfaces as well as the Bertrand lens are displaceable along the beam path to accommodate different microscope objectives, the position of the field-limiting element being unchanged.

In a further embodiment of the invention, the optical deflection element for selecting between the main beam path and the supplementary beam path can be inserted into and withdrawn from the main beam path, together with the third optical surface. Thus, it is possible to use, for example, a half-cube prism with two reflecting surfaces, which can be pushed into and out of the main beam path. Such a construction is certainly more advantageous than an arrangement with two mirrors separated from one another, one of which would be a totally reflecting mirror which could be pushed in and out to form the deflection element, while the other would be a stationary semi-transparent mirror.

The versatility of the arrangement can be increased, moreover, if other optical elements for different observation methods can be inserted into the main beam path when the optical deflection element for selecting between the main beam path and the supplementary beam path and the third optical surface are removed. An example is a divider mirror, by means of which all incident-light methods (interference contrast, polarisation, bright field) can be carried out.

To put the optical arrangement according to the invention into practice, the invention also provides a device comprising an elongate support member which is mountable adjacent the main beam path between the microscope objective and the observation tube, a first optical system, preferably a half-cube prism, movable into and out of the main beam path along the support member transversely to the main beam path and including the optical deflection element and the third optical surface, a second optical system including the first and second optical surfaces mounted towards one end of the support member so as to be displaceable along the support member, a Bertrand lens displaceably mounted on the support member in the beam path between the optical deflection element and the first optical surface, and a stationary field-limiting element associated with the Bertrand lens, preferably an iris diaphragm, mounted on the support member along the beam path between the second optical surface and the third optical surface, wherein the second optical system and the Bertrand lens can simultaneously be driven from a single rotary knob at said one end of the support member by means of two interconnected spindles of different lengths and different pitches, and the actuating means for displacing the first optical system are located at the other end of the elongate support member.

A device of this type can be designed as an additional unit which can be inserted as a kind of intermediate tube between the binocular observation tube or photographic tube and the microscope objective. However, a device of this type can also be designed as a built-in or built-on system to be located above the telephoto lens instead of the dual reflex prism, or as a push-in unit to be used instead of lighting modules.

This device exhibits remarkable lateral compactness with an overall height and width which are relatively small in comparison to its length, yet simple operation by means of a single rotary knob is ensured in spite of the displaceability of the Bertrand lens and the first and second optical surfaces, which allows the Bertrand lens to be focussed for adaptation to different microscope objectives. For objectives corrected closer than infinity a linear approximation of the movements is permissible because of the short displacement distance, whereas in the case of objectives corrected to infinity the Bertrand lens has in any case to move over double the distance of the first and second optical surfaces because of the fixed intermediate image.

Advantageously, the further optical elements, which can be moved into the main beam path by actuating means when the first optical system is moved out of the main beam path, can be mounted at the other end of the support member.

Further advantages, details and features of the invention will be apparent from the following description of a preferred exemplary embodiment, given with reference to the accompanying drawings.

BRIEF DESCRIPTION OF THE DRAWINGS

In the drawings:

FIG. 1 shows a side view of a device according to the invention;

FIG. 2 shows a plan view of the device illustrated in FIG. 1; and

FIG. 3 shows an end view of the device illustrated in FIG. 1.

DETAILED DESCRIPTION

An elongate support 10 carries a dovetail guide 11. Mounted displaceably on the dovetail guide 11 is a first optical system 12 comprising a half-cube prism 16 located on a holder 14 resting directly on the dovetail guide 11. The half-cube prism 16 has two reflecting surfaces, of which one surface 18 forms an optical deflection element which deflects the beam in main beam path 20 into supplementary beam path 22. Deflection occurs when the first optical system 12, located outside the main beam path 20 in the drawing, is positioned in the main beam path 20. It can be brought into this position by an actuating means 23 which can be actuated from the exterior and which is connected to the first optical system 12 via a rod 24.

Also mounted displaceably on the same dovetail guide 11 in the supplementary beam path 22 is a Bertrand lens 26, the position of which can be set precisely on a threaded spindle 28 by means of a rotary knob 30 located outside the support 10. By means of the same rotary knob 30, a second optical system 32, similarly guided on the dovetail guide 11, is adjustable on a hollow spindle mounted over the threaded spindle 28 and having a different length and thread pitch. The second optical system 32 has two optical mirrors 36, 38 which are fastened to a holder 34 and of which the mirror 36, acting as a first optical surface, deflects the supplementary beam path 22 upwards and the mirror 38, acting as a second optical surface, deflects the supplementary beam path 22 back to the first optical system 12. An iris diaphragm 40 is arranged so as to be stationary in the path to the first optcial system 12. Instead of the iris diaphragm 40, it is also possible to arrange a pinhole diaphragm so that it can be pushed into and out of the beam path.

The upper reflecting surface of the half-cube prism 16, which forms the third optical surface, deflects the beam in the supplementary beam path 22 upwards, so that it enters the main beam path 20 leading to the binocular observation tube, when the first optical system 12 is located in the main beam path 20.

Furthermore, at the opposite end of the support 10 to the second optical system 32, there is a third optical system 41. This is likewise mounted displaceably on the dovetail guide 11, and can be pushed into the main beam path 20 by means of a rod 42 and an actuating means 46 when the first optical system 12 is moved out of the main beam path 20. The third optical system 41 can be a divider mirror of neutral colour, a dark-field ring mirror, a dichroic divider mirror, an incident-light polariser or an analyser, so that different observation methods can be used and, above all, rapid alternation between the individual observation methods is guaranteed. Above all, however, a change can easily be made between the conoscopic observation method, in which the first optical system 12 must be located in the main beam path 20, and the orthoscopic observation method, in which the optical system 12 is located outside the main beam path 20.

We claim:

1. An optical arrangement for a microscope comprising a main beam path in which a microscope objective and an observation tube are located, a supplementary beam path which can be selectively interposed between the microscope objective and the observation tube in place of a portion of the main beam path, and an optical deflection element which can be inserted into the main beam path and withdrawn from the main beam path to select between the main beam path and the supplementary beam path whereby the beam from the microscope objective is deflected laterally away into the supplementary beam path when the optical deflection element is inserted into the optical main beam path, wherein said supplementary beam path includes at least first, second and third optical surfaces each deflecting the beam, the third optical surface deflecting the supplementary beam path into the observation tube, and a Bertrand lens and a field-limiting element associated with the Bertrand lens are provided between the optical deflection element and the third optical surface and wherein the first and second optical surfaces and the Bertrand lens are displaceable along the beam path to accommodate different microscope objective, the position of the field-limiting element being unchanged.

2. An optical arrangement according to claim 1, wherein the field-limiting element comprises an iris diaphragm.

3. An optical arrangement according to claim 1, wherein the Bertrand lens is located between the optical deflection element and the first optical surface, and the field-limiting element associated with the Bertrand lens is located between the second optical surface and the third optical surface.

4. An optical arrangement according to claim 1, wherein the optical deflection element for selecting between the main beam path and the supplementary beam path can be inserted into and withdrawn from the main beam path, together with the third optical surface.

5. An optical arrangement according to claim 4, wherein other optical elements for different observation methods can be inserted into the main beam path when the optical deflection element for selecting between the main beam path and the supplementary beam path is removed and the third optical surface is removed.

6. A device for selectively interposing a supplementary optical beam path between a microscope objective and a microscope observation tube in place of a portion of the main beam path in the microscope by means of an optical deflection element which can be inserted into the main beam path and withdrawn from the main beam path to select between the main beam path and the supplementary beam path, when the optical deflection element is inserted into the optical main beam path, and wherein said supplementary beam path includes at least first, second and third optical surfaces, each deflecting the beam, the third optical surface deflecting the supplementary beam path into the observation tube, said device comprising an elongate support member which is mountable adjacent the main beam path between the microscope objective and the observation tube, a first optical system movable into and out of the main beam path along the support member transversely to the main beam path and including the optical deflection element and the third optical surface, a second optical system including the first and second optical surfaces mounted towards one end of the support member so as to be displaceable along the support member, a Bertrand lens displaceably mounted on the support member in the beam path between the optical deflection element and the first optical surface, and a stationary field-limiting element associated with the Bertrand lens mounted on the support member along the beam path between the second optical surface and the third optical surface, wherein the second optical system and the Bertrand lens can simultaneously be driven from a single rotary knob at said one end of the support member by means of two interconnected spindles of different lengths and different pitches, and the actuating means for displacing the first optical system are located at the other end of the elongate support member.

7. A device according to claim 6, comprising at least one further optical element movable into the main beam path by actuating means when the first optical system is moved out of the main beam path, mounted at said other end of the support member.

8. A device according to claim 6, wherein the field-limiting element comprises an iris diaphragm.

9. A device according to claim 6, wherein the first optical system including the optical deflection element and the third optical surface comprises a half-cube prism.

10. An optical arrangement for a microscope including a main beam path in which a microscope objective and an observation tube are aligned, said optical arrangement comprising:

elongate support means having a width which is relatively small in comparison to the length thereof, means defining a supplemental beam path which can selectively interposed between the microscope objective and the observation tube in place of a portion of the main beam path, said supplemental beam path-defining means being supported by said support means in a generally elongate arrangement so that each of the overall width and height of said optical arrangement is relatively small in comparison to the overall length thereof, said optical arrangement adapted to be positioned within the microscope and said supplemental beam path-defining means including an optical deflection element supported by said support means for movement relative thereto so that when said optical arrangement is positioned within the microscope, said optical deflection element can be moved into and out of the main beam path to selectively insert the supplemental beam path into and withdraw the supplemental beam path from the main beam path, said optical arrangement being so arranged in relationship to the microscope when the supplemental beam path is positioned in the main beam path that the beam from the microscope objective is deflected laterally of the main beam path and along the supplemental beam path, said supplemental beam path-defining means including at least first, second and third optical surfaces for deflecting the beam wherein the third optical surface deflects the supplemental beam path into the observation tube, a Bertrand lens supported by said support means, a field-limiting element associated with the Bertrand lens wherein each of the Bertrand lens and the field-limiting element are operatively positioned in the supplemental beam path between the optical deflection element and the third optical surface said first and second optical surfaces being provided by an optical system which is supported by said support means for movement toward and away from the Bertrand lens, and a rotary knob and two spindles interconnected with one another and between said optical system and said Bertrand lens so that rotation of said rotary knob displaceably adjusts said optical system and said Bertrand lens relative to one another.

11. The optical arrangement of claim 10 wherein the Bertrand lens is supported by said support means for movement relative thereto and along the supplementary beam path to accommodate preselected microscope objectives.

12. The optical arrangement of claim 10 wherein the position of the field-limiting element is fixed relative to the supplementary beam path.

13. The optical arrangement of claim 10 further comprising at least one further optical element supported by said support means for movement into and out of the main beam path so that said one further optical element and said optical deflection system can be selectively positioned in the main beam path.

* * * * *